US012217572B2

(12) United States Patent
Tsombanidis

(10) Patent No.: US 12,217,572 B2
(45) Date of Patent: Feb. 4, 2025

(54) GAMING MACHINE AND METHOD WITH A PERSISTENT SYMBOL MODIFIER FEATURE

(71) Applicant: LNW Gaming, Inc., Las Vegas, NV (US)

(72) Inventor: Yanis Tsombanidis, Las Vegas, NV (US)

(73) Assignee: LNW Gaming, Inc., Las Vegas, NV (US)

(*) Notice: Subject to any disclaimer, the term of this patent is extended or adjusted under 35 U.S.C. 154(b) by 0 days.

(21) Appl. No.: 18/463,339

(22) Filed: Sep. 8, 2023

(65) Prior Publication Data

US 2023/0419787 A1 Dec. 28, 2023

Related U.S. Application Data

(63) Continuation of application No. 17/675,101, filed on Feb. 18, 2022, now Pat. No. 11,798,372.

(51) Int. Cl.
*G07F 17/00* (2006.01)
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
None
See application file for complete search history.

(56) References Cited

U.S. PATENT DOCUMENTS

| | | | | |
|---|---|---|---|---|
| 8,287,357 | B2 | 10/2012 | Evans | |
| 8,287,812 | B2 * | 10/2012 | Fernandez | G01N 21/6452 422/82.08 |
| 2008/0318668 | A1 * | 12/2008 | Ching | G07F 17/3258 463/25 |
| 2009/0224478 | A1 * | 9/2009 | Evans | G07F 17/3293 463/13 |
| 2011/0086695 | A1 * | 4/2011 | Evans | G07F 17/32 463/43 |
| 2011/0111824 | A1 * | 5/2011 | Cuddy | G07F 17/3223 463/43 |
| 2020/0202671 | A1 * | 6/2020 | Halvorson | G07F 17/3262 |
| 2021/0256812 | A1 * | 8/2021 | Kearns | G07F 17/3213 |

OTHER PUBLICATIONS

Playboy Cash Wheel game brochure, Copyright 2021 Scientific Games Corporation.

* cited by examiner

*Primary Examiner* — Paul A D'Agostino

(57) ABSTRACT

According to an embodiment of the present invention, there is provided gaming methods and a system that utilize a presentation assembly configured to present a first series of spins of a plurality of reels arranged in an array, the plurality of reels including value-bearing symbols, wherein, when at least a specified number of the value-bearing symbols land in the array, the value-bearing symbols are held in place during a second series of spins of the plurality of reels in which the plurality of reels include advancement symbols. When an advancement symbol lands in the array, an index indicating one of a plurality of modifiers is incremented. At a conclusion of the second series of spins, the values of the held value-bearing symbols are modified according to the currently indexed modifier and a corresponding payout is awarded.

20 Claims, 7 Drawing Sheets

GAMING MACHINE AND METHOD WITH A PERSISTENT SYMBOL MODIFIER FEATURE

CROSS-REFERENCE TO RELATED APPLICATIONS

This patent application is a continuation of U.S. patent application Ser. No. 17/675,101, filed on Feb. 18, 2022, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022-2023, LNW Gaming, Inc.

FIELD OF THE INVENTION

The present invention relates to a technological improvement to gaming systems, gaming machines, and methods and, more particularly, to new and improved animations in connection with a feature in which a first series of spins of a plurality of reels captures and holds a plurality of value-bearing symbols in an array and a second series of spins of the plurality of reels detects advancement symbols in the array that increment an index indicating one of a plurality of modifiers. At the conclusion of the second series of spins, the values of the held value-bearing symbols are modified according to the currently indexed modifier and a payout is awarded.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided gaming methods and a system that utilize a presentation assembly configured to present a first series of spins of a plurality of reels arranged in an array, the plurality of reels including value-bearing symbols, wherein, when at least a specified number of the value-bearing symbols land in the array, the value-bearing symbols are held in place during a second series of spins of the plurality of reels in which the plurality of reels include advancement symbols. When an advancement symbol lands in the array, an index indicating one of a plurality of modifiers is incremented. At a conclusion of the second series of spins, the values of the held value-bearing symbols are modified according to the indexed modifier and a corresponding payout is awarded.

Additional aspects of the invention will be apparent to those of ordinary skill in the art in view of the detailed description of various embodiments, which is made with reference to the drawings, a brief description of which is provided below.

Figure 1:
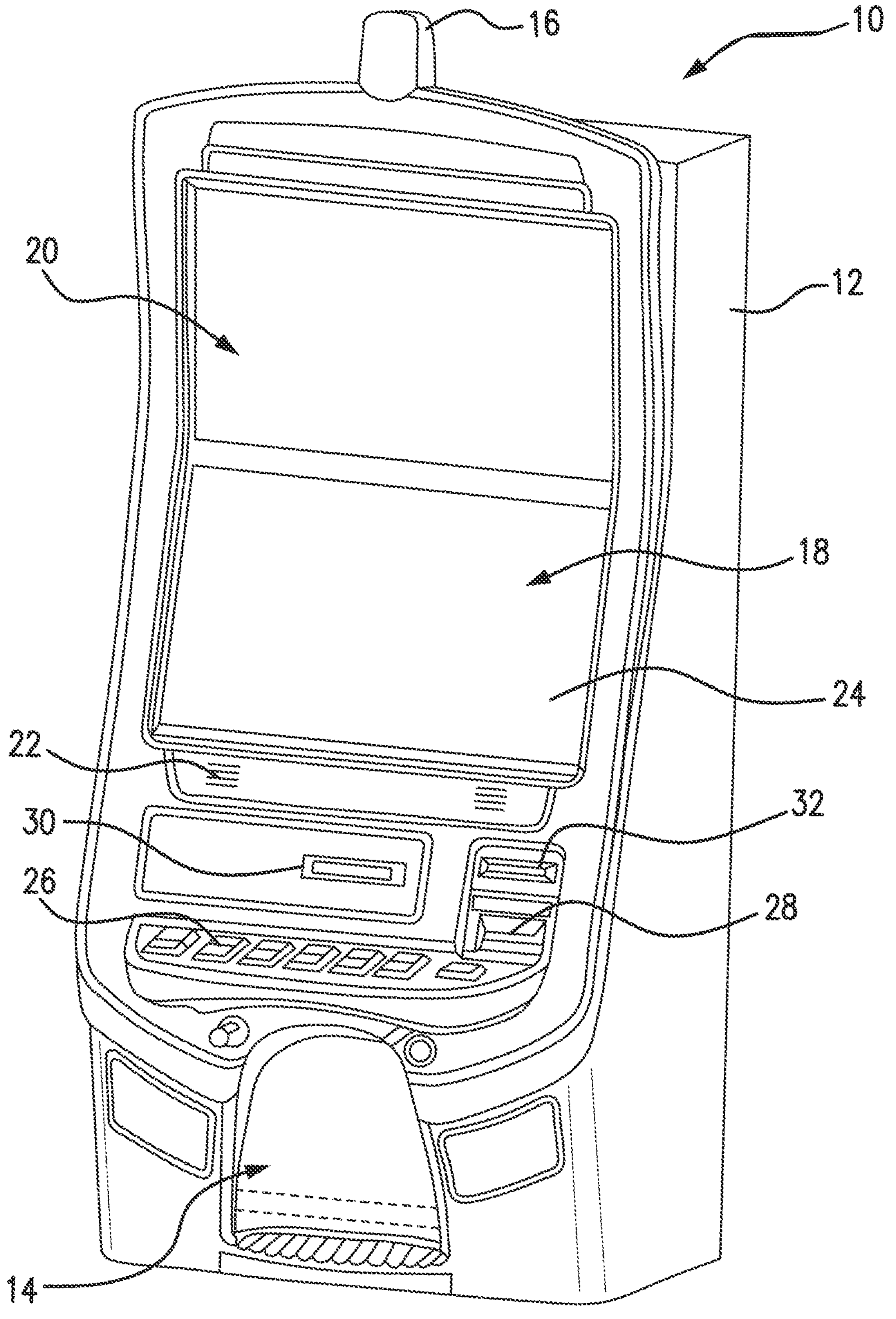
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 4-8). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIGS. 4-8), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
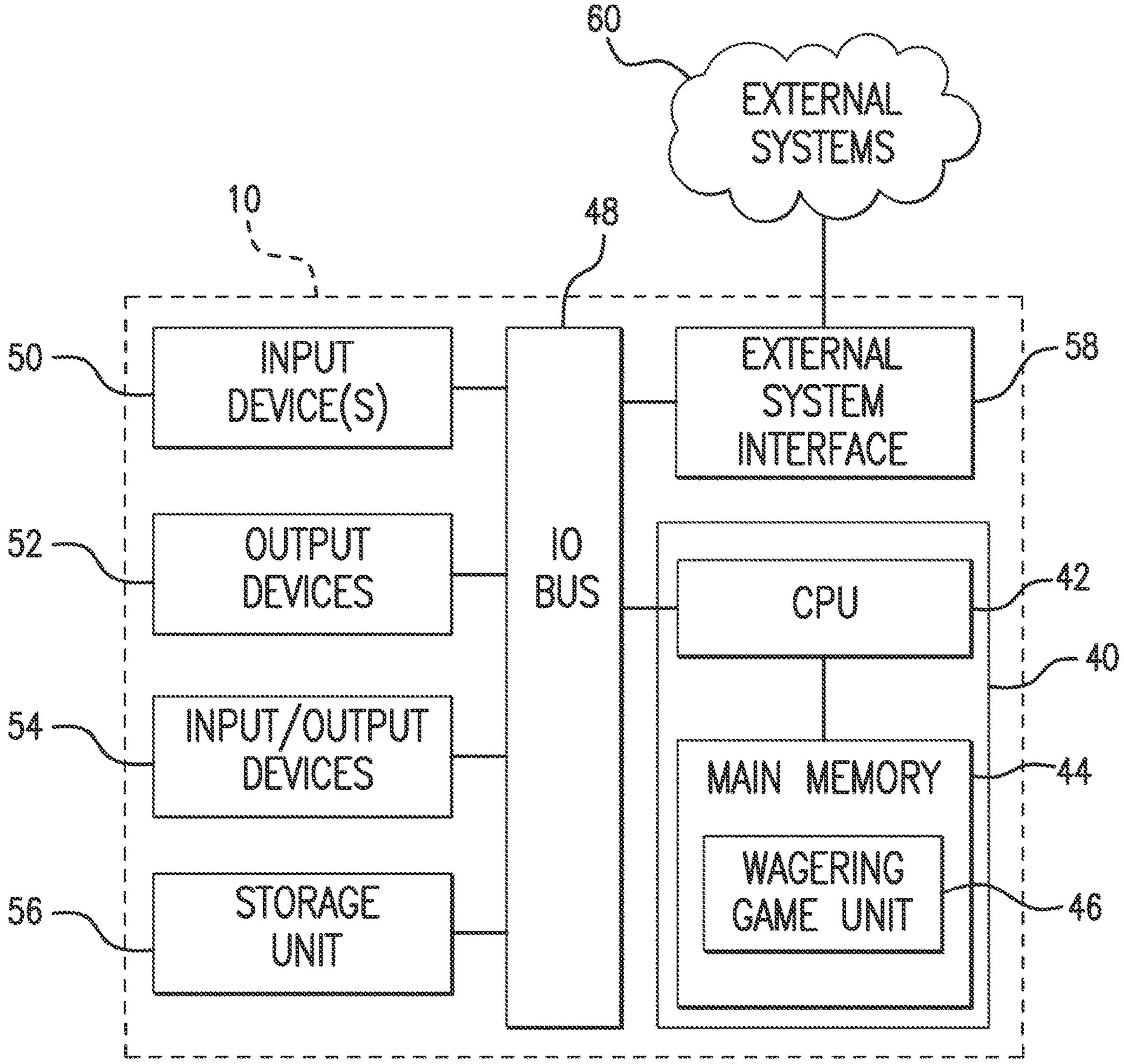
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)— all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 3:
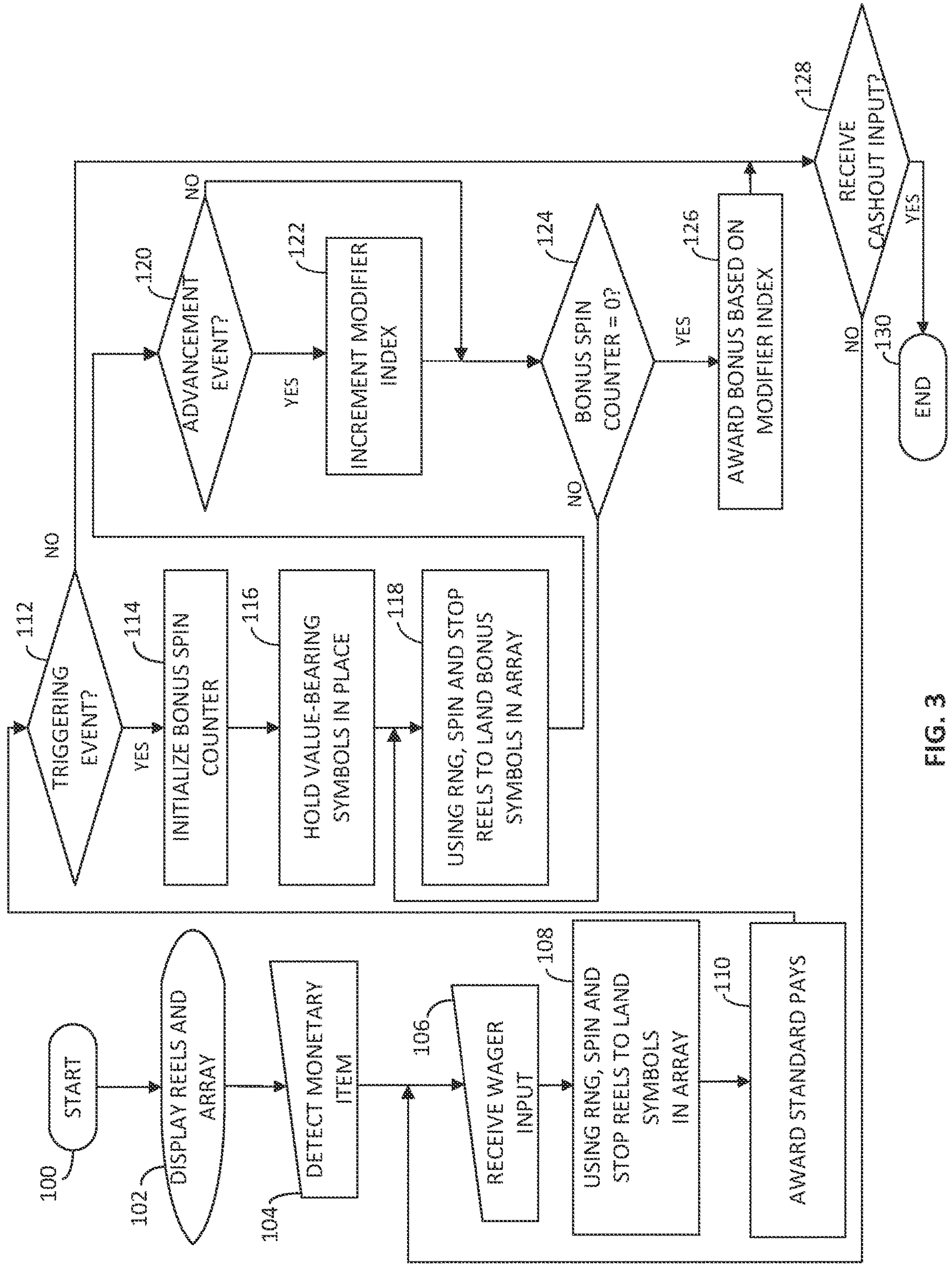
FIG. 3 is a flowchart for a data processing method that corresponds to instructions executed by a controller, according to an embodiment of the present invention.

Referring now to FIG. 3, there is shown a flowchart representing one data processing method corresponding to at least some instructions stored and executed by the game-logic circuitry 40 in FIG. 2 to perform operations according to an embodiment of the present invention. The data processing method is described below in connection with an exemplary representation of a set of game presentations in FIGS. 4-11.

The data processing method commences at step 100. At step 102, the game-logic circuitry controls one or more presentation devices (e.g., mechanical-reel display device, video display device, or a combination thereof) that presents a plurality of symbol-bearing reels and an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position.

In the examples shown in FIGS. 4-11, the presentation device presents a three-by-five array 230 comprising three rows 220, 222, 224 and five columns 210, 212, 214, 216, 218. Each column is associated with a respective reel such that the reel populates the three symbol positions in the associated column. The reels bear a plurality of symbols. In one embodiment, the plurality of symbols include standard symbols A, B, C, D, E, and F and value-bearing symbols V. Each value-bearing symbol V is associated with a credit or currency value indicated on the symbol itself. The value on a particular symbol V may be fixed or variable (e.g., random) from one game cycle to the next. Different value-bearing symbols V on the reels may have different values. In one or more embodiments, a value-bearing symbol V may be associated with a value determined separately. For example, rather than a specific amount, a GRAND, MAJOR, MINOR, or MINI progressive label may be indicated on a value-bearing symbol V. Each reel may contain one or more stacks (i.e., clumps) of value-bearing symbols V that appear adjacent to each other along the reel. The values of the value-bearing symbols V in any given stack may be the same or different. A stack of value-bearing symbols V may consist of two, three, four, or more adjacent symbols V. Further, adjacent reels may contain one or more "mega" value-bearing symbols V that move as one block as the reels spin. When the spin is complete, each individual row and column of the array underlying any visible portion of the "mega" symbol is assigned the value associated with the "mega" value-bearing symbol. For example, a "mega" value bearing symbol may comprise a two row high square spanning columns 212 and 214. If this symbol stops aligned with rows 220 and 222, the symbols at row 220, column 212, row 220, column 214, row 222, column 212 and row 222, column 214 would all be treated as though individual value-bearing symbols V having the value of the "mega" symbol had landed in those locations.

Returning to FIG. 3, at step 104, the game-logic circuitry detects, via a value input device, a physical item associated with a monetary value that establishes a credit balance. As shown in FIGS. 4-11, the credit balance may be shown on a credit meter 200 of the gaming machine.

At step 106, the game-logic circuitry initiates a wagering game cycle in response to an input indicative of a wager covered by the credit balance. To initiate a spin of the reels, the player may press a "Spin" or "Max Bet" key on a button panel or touch screen. As shown in FIGS. 4-11, the wager may be shown on a bet meter 202.

At step 108, using an RNG, the game-logic circuitry spins and stops the reels to randomly land symbols from the reels in the array in visual association with one or more pay lines (also known as lines, ways, patterns, or arrangements). The reel spin may be animated on a video display by depicting symbol-bearing strips moving vertically across the display and synchronously updating the symbols visible on each strip as the strip moves across the display.

Figure 4:
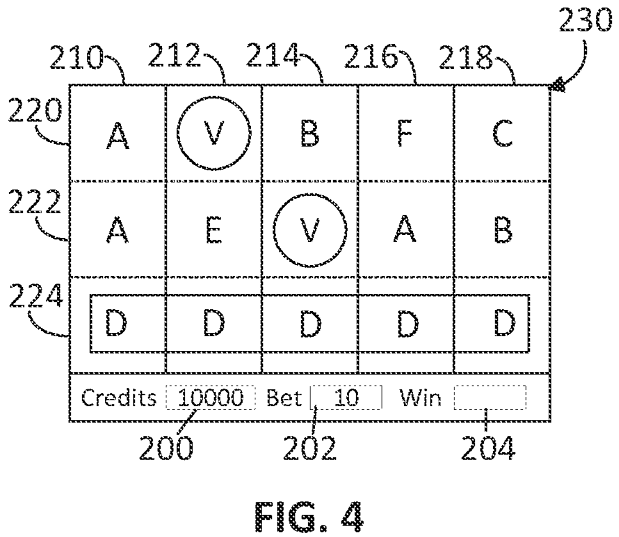
FIGS. 4-11 illustrate examples of game presentations corresponding to various steps presented in FIG. 3.

At step 110, the game logic circuitry determines whether one or more patterns of symbols that landed in the array correspond to winning patterns in a pay table. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. For simplicity, in the examples shown in FIGS. 4-11, standard pays are limited to line pays along three horizontal paylines starting from the leftmost reel: a first payline spanning the middle row 222 of the array 230, a second payline spanning the top row 220 of the array 230, and a third payline spanning the bottom row 224 of the array 230. FIG. 4, for example, depicts a line pay of five D symbols along the bottom row 224 of the array 230. The winning combination may be animated or highlighted; for example, a rectangle is displayed around the five D symbols in row 224.

If at least one winning outcome in detected at step 110, the game logic circuitry pays in accordance with the paytable. The awarded pays are added to the win meter 204 and credit meter 200.

At step 112, the game-logic circuitry determines whether a bonus triggering event has occurred. In the embodiment shown, the triggering event comprises at least a certain number (e.g., three) of value-bearing symbols V landing in the array in the current game cycle. In one or more alternate embodiments, the game-logic circuitry may employ other means to determine a triggering event for the bonus. For example, without limitation, the triggering event may be based on a random determination using the RNG, when one or more scattered non-value-bearing symbols appear, after a certain number of losing base game spins have occurred, etc. If no triggering event has occurred, for example, the array does not contain a sufficient number of value-bearing symbols V, as shown in FIG. 4, the game-logic circuitry immediately proceeds to step 128.

Figure 5:
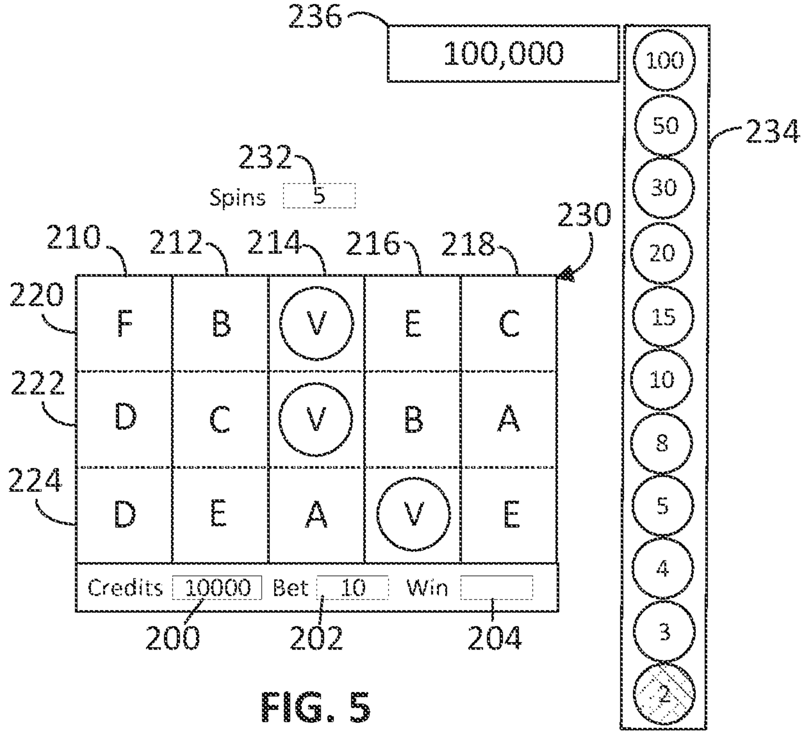

If, at step 112, a bonus triggering event has occurred, the game logic circuitry conducts a bonusing game including a number of free spins. The method illustrated describes a base game and a bonus game triggered during play of the underlying base game. In one or more alternate embodiments, the concept of detecting and holding value-bearing symbols in an array may apply to a base game, a bonus game, or both. The bonus game may be a series of free spins utilizing steps 102 and 114 through 124 of the method in FIG. 3. In the illustrated embodiment, three or more value-bearing symbols V trigger the bonus, as shown in FIG. 5. The number of free spins may be fixed or variable, but in the illustrated embodiment, when the bonus game commences, a spin counter 232 may be initialized to a reset value, such as five, at step 114. The spin counter 232 decrements after each free spin. In some embodiment, the spin counter 232 may be reset whenever a certain event occurs, for example, if a particular symbol lands in the array during the free spins. The series of free spins continues until the spin counter 232 reaches zero, at which point the bonus game ends and the method returns to the base game.

At step 116, the triggering value-bearing symbols are held in place on the array, their values, modified according to a modifier, to be awarded later at the conclusion of the bonus. By way of example, if the spin generates the array of symbols shown in FIG. 5 (which includes three value-bearing symbols in columns 214 and 216), the game-logic circuitry holds, or persists, the value-bearing symbols in their locations in the array, as shown in FIGS. 6-10.

At step 118, again using the RNG, the game-logic circuitry spins and stops the reels to randomly land bonus symbols from the reels in the bonus array. The set of bonus symbols may be the same or different than the set of symbols used on the reels in the base game. In some embodiments, the set of bonus symbols may be a randomly selected set of symbols selected from a plurality of sets of symbols. As above, the reel spin may be animated on a video display by depicting symbol-bearing strips moving vertically across the display and synchronously updating the symbols visible on each strip as the strip moves across the display. The value-bearing symbols V held in place on the array cover any bonus symbols that land in the same positions as the held symbols. At the conclusion of the bonus spin, the spin counter 232 is decremented at step 122, as shown, for example, in the change to the spin counter 232 between FIG. 5 and FIG. 6.

At step 120, the game-logic circuitry determines whether an advancement event has occurred. In the examples shown in FIGS. 6-10, the set of bonus symbols includes advancement symbols, designated by a circled caret. In the embodiment illustrated by FIGS. 6-10, each advancement symbol that lands in the array qualifies as an advancement event at step 122. In other embodiments, the bonus free spin game, like the base game, may include a paytable of winning combinations that also pay awards when winning combinations according to the paytable land in the array during the free spins. The paytable may be the same as the base game table or be different. In still other embodiments, the set of bonus symbols may include additional value-bearing symbols V that are also held in place when they land on the array. Like those originally held in the base game, the values of these value-bearing symbols V are also modified at the conclusion of the free spins (per the description of steps 124 and 126, below). In some embodiments, the advancement event may be tied to whether a winning combination has occurred on the current bonus spin, whether a winning combination has not occurred on the current bonus spin, or any other game-related event. If an advancement event has occurred, keeping in mind that more than one advancement event may occur on a given bonus spin, an index into a list of modifiers is incremented at step 122. In the current embodiment, a vertical ladder display 234 is presented by the presentation assembly, the ladder display 234 including a plurality of modifiers, illustrated as a series of value-bearing circles, each of which may be highlighted according to the current value of the index. In other embodiments, the ladder 234 may be oriented horizontally, or any display, such as a simple text description, may be employed to indicate the nature of currently indexed modifier. Though not shown in the flowchart of FIG. 3, in some embodiments, if the index increments past the end of the list of modifiers, for example, beyond 11 possible modifiers in the illustrated embodiment, a special "grand prize" 236 may be awarded and the bonus game is terminated with the game-logic circuitry proceeding to step 128. In still other embodiments, if the index increments past the end of the list of modifiers, the highest modifier may be immediately applied to the held value-bearing symbols as described with respect to step 126, below, and the bonus game is terminated with the game-logic circuitry proceeding to step 128.

At step 124, the game logic circuitry determines whether any bonus spins remain on the spin counter 232. If so, it returns for another bonus spin starting at step 118. (See FIGS. 6-9) However, if no bonus spins remain, it sums the values of each of the held value-bearing symbols V and modifies them according to the indexed modifier before awarding the result at step 126. In the example of FIG. 10, the sum is multiplied by 30, as will be further described below. In other embodiments, the modifier need not be a multiplier, just any rule that is applied to the sum of the values of the persisted value-bearing symbols V. As noted above, these values may be amounts directly indicated on the collected value-bearing symbols V or, if the indicated amount was an indirect amount (such as a reference to a progressive award), the value of the indirect amount is resolved and added to the sum. The total is then awarded by displaying it on the win meter 202 and adding it to the credit meter 200. At this point, the game circuit logic terminates the bonus spins and proceeds to step 128.

At step 128, the game-logic circuitry determines whether it has received a cashout input via at least one of the one or more player input devices of the gaming machine. If it has not received a cashout input, the game-logic circuitry waits for the next wager input at step 106. If it has received a cashout input, the game-logic circuitry initiates a payout from the credit balance on the credit meter such as the meter 200 in FIGS. 4-11 and the data processing method ends at step 130.

In the description of each of FIGS. 4-11 below, reference is made to certain applicable steps from FIG. 3.

Referring to FIG. 4, which illustrates an example of the display at the conclusion of a representative base game spin (steps 106-108):

The appearance of five D symbols in row 224 (step 108) may generate a standard pay award according to the paytable (step 110).

Two value-bearing symbols V landed in columns 212 and 214 (step 108). Because there were less than three value-bearing symbols V in the array (step 112), there were not enough trigger symbols to trigger a series of bonus spins.

Referring to FIG. 5, which illustrates the display at the conclusion of a second base game spin (steps 106-108):

No standard pays appeared in array 230 (step 110).

Three value-bearing symbols V landed in columns 214, and 216 (step 108).

Because there were three or more value-bearing symbols V in the array (step 112) shown in FIG. 5, this qualified as a triggering event.

Spin counter 232 was presented and initialized to 5 (step 114).

The three value-bearing symbols V shown in the array in FIG. 5 were held in place in the array (step 116).

A ladder 234 representing the list of possible modifiers was presented and the index was initialized to the first position, thus, a 2 times multiplier is highlighted on ladder 234.

Figure 6:
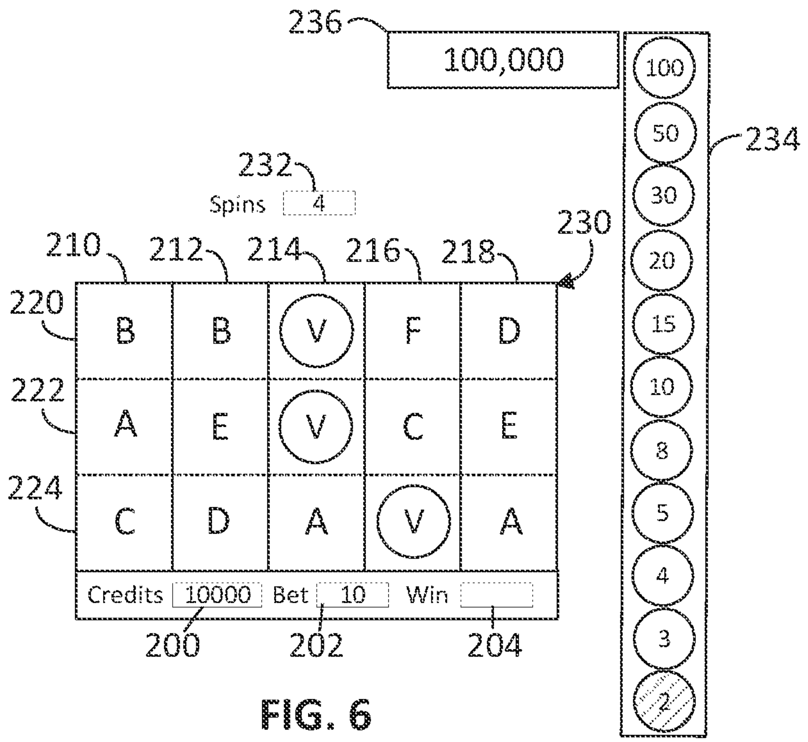

Referring to FIG. 6, which illustrates an example of the display at the conclusion of a representative first bonus spin (steps 118-124):

The entire array was populated with bonus symbols by using the RNG to spin and stop the reels in columns 210-218 (step 118). In the examples shown in FIGS. 6-10, during bonus spins, the value-bearing symbols V held in place on the array cover any bonus symbols that land in the same positions as the held symbols.

No advancement symbols landed in the array (step 120). Thus, the indexed modifier on ladder 234 remained unchanged.

The bonus spin counter 232 was decremented (step 124) from 5 (as in FIG. 5) to 4.

Figure 7:
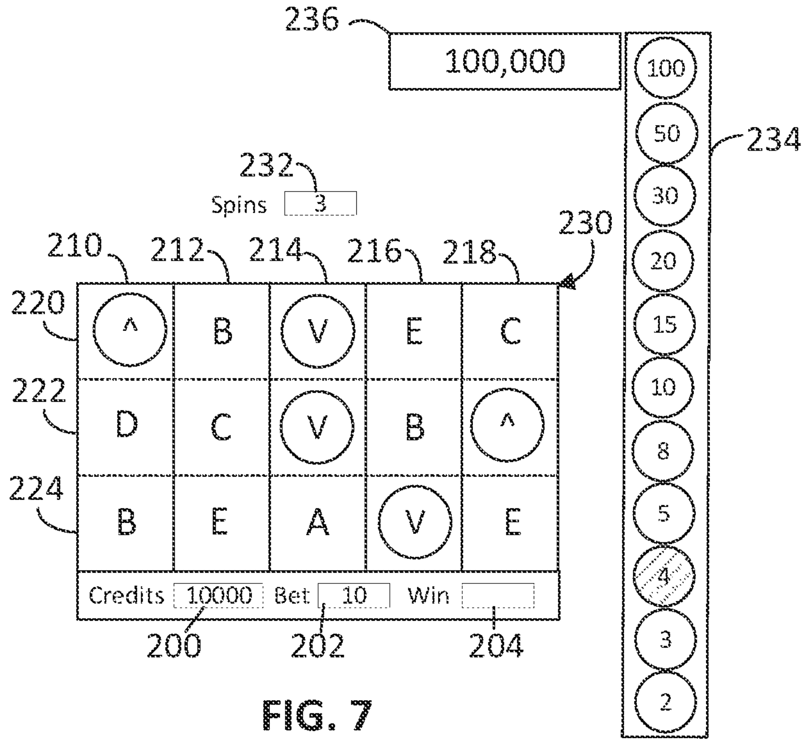

Referring to FIG. 7, which illustrates an example of the display at the conclusion of a representative second bonus spin (steps 118-124):

The entire array was populated with bonus symbols by using the RNG to spin and stop the reels as described with respect to FIG. 6.

Two advancement symbols landed in the array in columns 210 and 218 (step 120). Thus, the index was incremented twice (step 122), the highlighted modifier on ladder 234 becoming the 4 times multiplier.

The bonus spin counter 232 was decremented (step 124) from 4 (as in FIG. 5) to 3.

Figure 8:
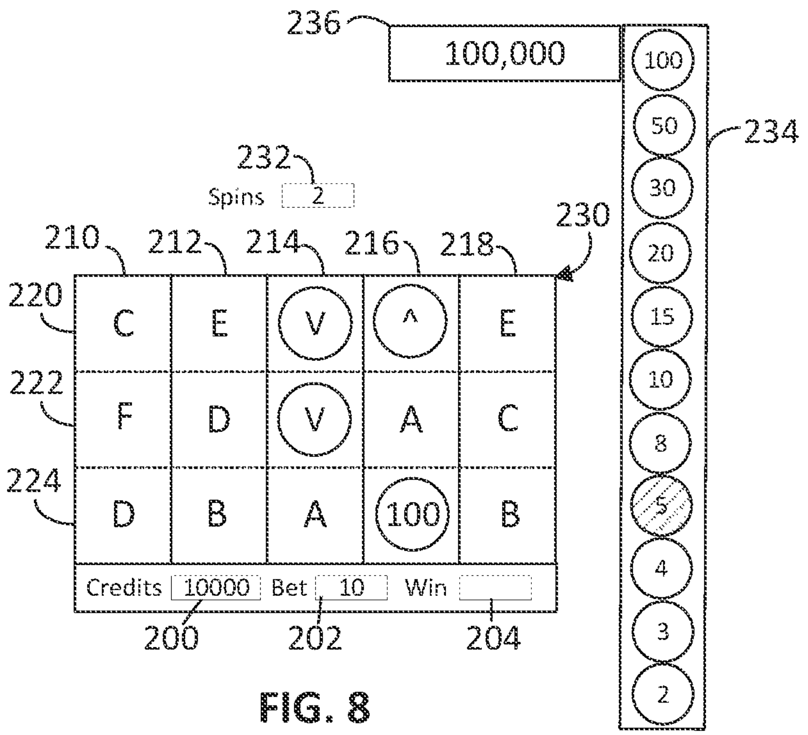

Referring to FIG. 8, which illustrates an example of the display at the conclusion of a representative third bonus spin (steps 118-124):

The entire array was populated with bonus symbols by using the RNG to spin and stop the reels as described with respect to FIG. 6.

One advancement symbol landed in the array in column 216 (step 120). Thus, the index was incremented once (step 122), the highlighted modifier on ladder 234 becoming the 5 times multiplier.

The bonus spin counter 232 was decremented (step 124) from 3 (as in FIG. 5) to 2.

Figure 9:
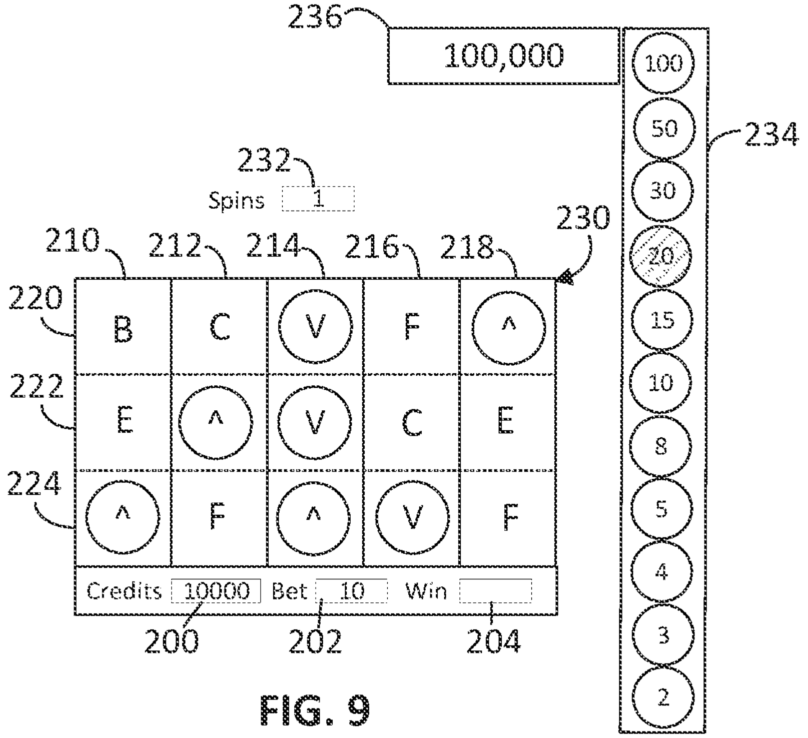
Figure 10:
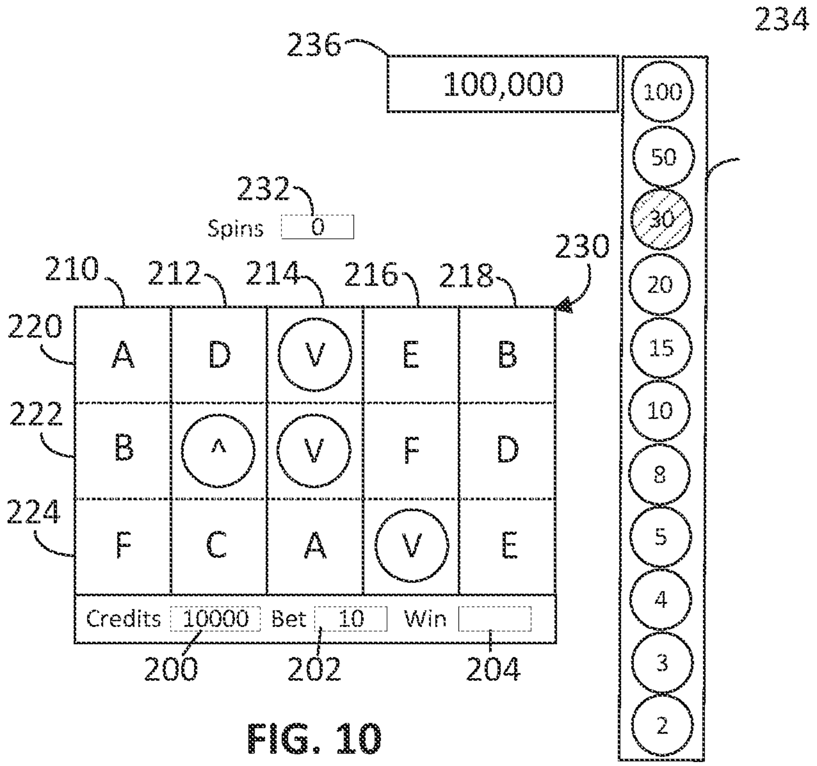

Referring to FIG. 9, which illustrates an example of the display at the conclusion of a representative fourth bonus spin (steps 118-124):

The entire array was populated with bonus symbols by using the RNG to spin and stop the reels as described with respect to FIG. 6.

Four advancement symbols landed in the array in columns 210, 212, 214 and 218 (step 120). Thus, the index was incremented four times (step 122), the highlighted modifier on ladder 234 becoming the 20 times multiplier.

The bonus spin counter 232 was decremented (step 124) from 2 (as in FIG. 5) to 1.

Referring to FIG. 10, which illustrates an example of the display at the conclusion of a representative fifth and final bonus spin (steps 118-124):

The entire array was populated with bonus symbols by using the RNG to spin and stop the reels as described with respect to FIG. 6.

One advancement symbol landed in the array in column 212 (step 120). Thus, the index was incremented once (step 122), the highlighted modifier on ladder 234 becoming the 30 times multiplier.

The bonus spin counter 232 was decremented (step 124) from 1 (as in FIG. 5) to 0.

Because no bonus spins remain (step 124), the sum of the values of each of the persisted value-bearing symbols V was modified according to the highlighted modifier, i.e., multiplied by 30, and awarded (step 126).

Figure 11:
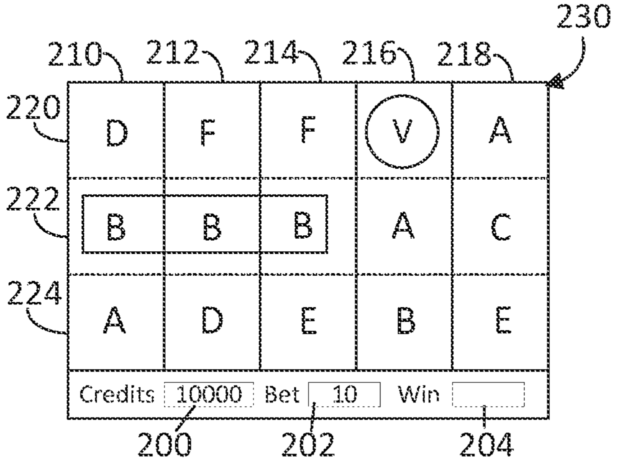

Referring to FIG. 11, which illustrates an example of the display at the conclusion of a third base game spin (steps 106-108):

Because the game returned to a base game mode, spin counter 232 and ladder 234 were removed from the display prior to the spin.

The appearance of three B symbols in row 222 (step 108) generated a standard pay award according to the paytable (step 110).

One value-bearing symbol V landed in column 216 (step 108). Because there were less than three value-bearing symbols V in the array (step 112), there were not enough trigger symbols to trigger a series of bonus spins.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

presenting, by a presentation assembly, a plurality of symbol-bearing reels, an array, and a modifier indicator; and accepting, via a value input device, a physical item associated with a monetary value to establish a credit balance;

conducting, by game-logic circuitry, a first series of spins of the plurality of reels, the symbols borne by the reels including value-bearing symbols, each spin of the first series of spins including spinning and stopping the plurality of reels to land symbols in the array, the landed symbols indicating a triggering event when the landed symbols include a predetermined number of the value-bearing symbols;

in response to an indication of the triggering event, holding the landed value-bearing symbols in place in the array and, conducting, by the game-logic circuitry, a second series of spins of the plurality of reels, the symbols borne by the reels including advancement symbols, each spin of the second series of spins including spinning and stopping the plurality of reels to land symbols in the array, wherein an index indicating one of a plurality of modifiers is incremented each time the landed symbols include an advancement symbol, the modifier indicator indicating the indexed one of the plurality of modifiers;

at the conclusion of the second series of spins, if the index exceeds a predetermined value, issuing a fixed award, otherwise issuing an award based on the values of the held value-bearing symbols as modified by the indexed one of the plurality of modifiers.

2. The method of claim 1, wherein the plurality of modifiers comprise multipliers.

3. The method of claim 1, wherein, for each spin in the first series, the method further includes the operation of receiving, via an electronic input device, an input indicative of a wager drawn from the credit balance.

4. The method of claim 1, wherein each spin in the second series of spins is a free spin.

5. The method of claim 1, wherein the modifier indicator is in the form of a modifier ladder.

6. The method of claim 1, wherein the greater the value of the index, the more impact the indexed modifier has on the award.

7. A method of operating a gaming machine, the method comprising the operations of:

presenting, by a presentation assembly, a plurality of symbol-bearing reels, an array, and a modifier indicator; and accepting, via a value input device, a physical item associated with a monetary value to establish a credit balance;

conducting, by game-logic circuitry, a first series of spins of the plurality of reels, the symbols borne by the reels including value-bearing symbols, each spin of the first series of spins including spinning and stopping the plurality of reels to land symbols in the array;

in response to a triggering event, holding any landed value-bearing symbols in place in the array and, conducting, by the game-logic circuitry, a second series of spins of the plurality of reels, the symbols borne by the reels including advancement symbols, each spin of the second series of spins including spinning and stopping the plurality of reels to land symbols in the array, wherein an index indicating one of a plurality of modifiers is incremented each time the landed symbols include an advancement symbol, the modifier indicator indicating the indexed one of the plurality of modifiers; and at the conclusion of the second series of spins, if the index exceeds a predetermined value, issuing a fixed award, otherwise issuing an award based on the values of the held value-bearing symbols as modified by the indexed one of the plurality of modifiers.

8. The method of claim 7, wherein the triggering event comprises the landed symbols including a predetermined number of the value-bearing symbols.

9. The method of claim 7, wherein the triggering event comprises a predetermined number of consecutive losing outcomes, according to a paytable, of the first series of spins.

10. The method of claim 7, wherein the plurality of modifiers comprise multipliers.

11. The method of claim 7, wherein, for each spin in the first series, the method further includes the operation of receiving, via an electronic input device, an input indicative of a wager drawn from the credit balance.

12. The method of claim 7, wherein each spin in the second series of spins is a free spin.

13. The method of claim 7, wherein the modifier indicator is in the form of a modifier ladder.

14. The method of claim 7, wherein the greater the value of the index, the more impact the indexed modifier has on the award.

15. A gaming system comprising:

a gaming machine including a presentation assembly configured to present a plurality of reels, an array, and a modifier indicator, the plurality of reels bearing a plurality of symbols; and game-logic circuitry configured to perform the operations of:

accepting, via a value input device, a physical item associated with a monetary value to establish a credit balance;

conducting a first series of spins of the plurality of reels, the symbols borne by the reels including value-bearing symbols, each spin of the first series of spins including spinning and stopping the plurality of reels to land symbols in the array, the landed symbols indicating a triggering event when the landed symbols include a predetermined number of the value-bearing symbols;

in response to the indication of the triggering event, holding the landed value-bearing symbols in place in the array and, conducting a second series of spins of the plurality of reels, the symbols borne by the reels including advancement symbols, each spin of the second series of spins including spinning and stopping the plurality of reels to land symbols in the array, wherein an index indicating one of a plurality of modifiers is incremented each time the landed symbols include an advancement symbol, the modifier indicator indicating the indexed one of the plurality of modifiers; and at the conclusion of the second series of spins, if the index exceeds a predetermined value, issuing a fixed award, otherwise issuing an award based on the values of the held value-bearing symbols as modified by the indexed one of the plurality of modifiers.

16. The gaming system of claim 15, wherein the plurality of modifiers comprise multipliers.

17. The gaming system of claim 15, wherein, for each spin in the first series, the method further includes the operation of receiving, via an electronic input device, an input indicative of a wager drawn from the credit balance.

18. The gaming system of claim 15, wherein each spin in the second series of spins is a free spin.

19. The gaming system of claim 15, wherein the modifier indicator is in the form of a modifier ladder.

20. The gaming system of claim 15, wherein the greater the value of the index, the more impact the indexed modifier has on the award.

* * * * *